Jan. 21, 1941.                G. W. GARMAN                2,229,449
                           PHASE SHIFTING CIRCUIT
                           Filed Dec. 14, 1937
Fig. 1.
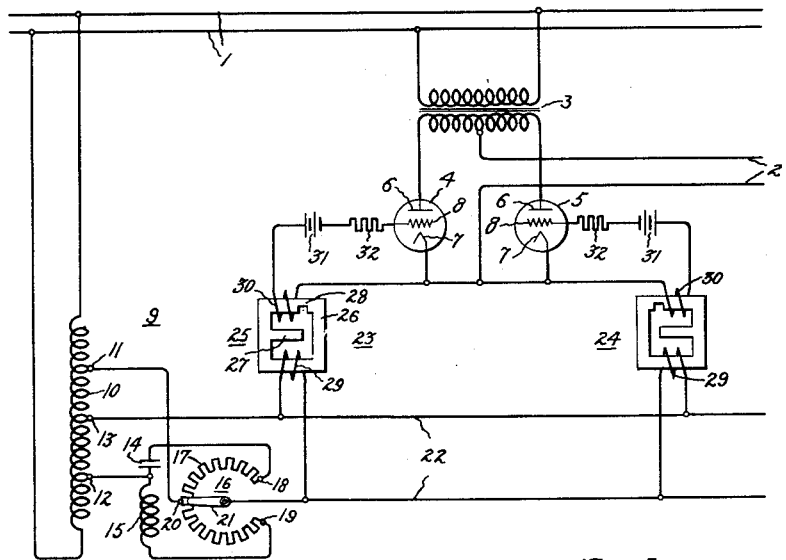
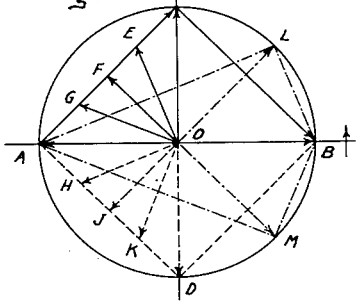
Fig. 2.
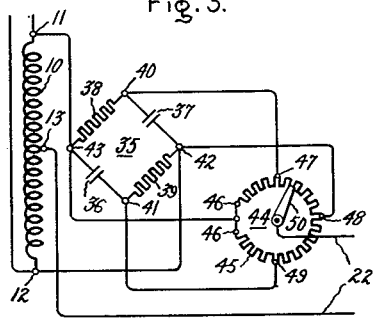
Fig. 5.
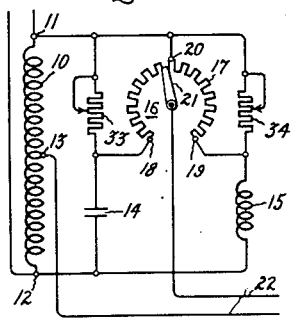
Fig. 3.
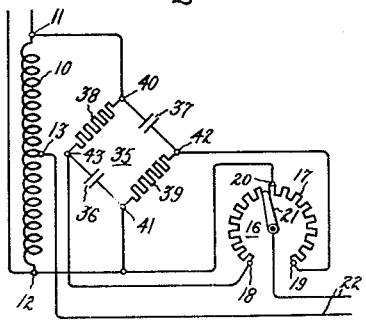
Fig. 4.
Inventor:
George W. Garman,
by Harry E. Dunham
His Attorney.

Patented Jan. 21, 1941

2,229,449

UNITED STATES PATENT OFFICE 2,229,449

PHASE SHIFTING CIRCUIT

George W. Garman, Scotia, N. Y., assignor to General Electric Company, a corporation of New York Application December 14, 1937, Serial No. 179,710

5 Claims. (Cl. 172—238)

My invention relates to electric circuits and more particularly to electric circuits for shifting the phase of an alternating potential derived from a source with respect to the potential of that source.

My invention is of general application in electric control and regulating systems, although it is particularly adapted for use in connection with electric power converting apparatus for transmitting energy between direct current and alternating current systems, or between alternating current systems, by the use of electric valves. In such applications it is customary to control the transmission of power between the direct current and the alternating current systems, or between alternating current systems, by shifting the phase of the potentials applied to the control members or grids of the electric valves with respect to the applied anode-cathode potentials. Various arrangements have been provided heretofore to effect this phase shift of the grid potential. Static phase shifters, that is, electric circuits including various combinations of resistance, inductance and capacitance, have proved to be most satisfactory from the standpoint of simplicity, economy and reliability. In view of the peculiar adaptability of phase shifting circuits of the static type, there has been evident a decided need for improved circuits of this nature which are simple in construction and arrangement and which employ a minimum number of impedance elements.

It is an object of my invention to provide a new and improved electric circuit.

It is another object of my invention to provide a new and improved electric phase shifting circuit of the static impedance type.

It is a further object of my invention to provide a new and improved static impedance phase shifting circuit for controlling electric power converting apparatus.

According to the illustrated embodiments of my invention, I provide static phase shifting circuits for producing an alternating voltage variable in phase with respect to the voltage of an alternating current circuit. The phase shifting circuit includes a winding which is energized from the alternating current circuit, and the winding is provided with a pair of terminal connections and a resistance electrically intermediate the terminal connections. A pair of electric circuits is connected to one of the terminal connections, and one of the electric circuits includes an inductance and the other includes a capacitance. A voltage divider including a resistance is interposed between the pair of circuits and the other terminal connection of the winding. The voltage divider includes a resistance having terminals connected to the capacitance and the inductance, and the resistance is provided with an intermediate point which is connected to the other terminal connection. An adjustable or movable contact member is provided in operative relation with the resistance of the voltage divider to control the phase of the alternating voltage impressed on an output circuit which is connected between the movable contact member and the intermediate connection of the winding. In one embodiment of my invention the adjustable resistances are connected between the capacitance, the inductance and the other terminal of the winding to establish a range of phase shift of the voltage impressed on the output circuit.

In another embodiment of my invention, I provide a phase shifting circuit of the static impedance type which comprises an electric network of the bridge type in which opposite arms are of the reactive type and in which other opposite arms are of the resistive type. The reactive branches of the network may be inductances or capacitances. One pair of opposite junctures of the reactive elements and the resistances is connected to terminal connections of a winding which is energized from an alternating current circuit, and the other pair of opposite junctures of the reactive elements and the resistances are connected to a resistance of a voltage divider. The resistance of the voltage divider is provided with an intermediate point which is connected to one of the terminal connections of the winding, and the resistance of the voltage divider is each provided with a movable or adjustable contact member in operative relation with the resistance. An output circuit is connected to an intermediate connection of the winding and the movable contact member of the voltage divider.

For a better understanding of my invention, reference may be had to the following description taken in connection with the accompanying drawing and its scope will be pointed out in the appended claims. Fig. 1 diagrammatically illustrates an embodiment of my invention as applied to an electric valve power converting system and Fig. 2 represents certain operating characteristics thereof. Figs. 3, 4 and 5 diagrammatically illustrate further modifications of my invention.

Fig. 1 of my invention is diagrammatically illustrated as applied to an electric valve power converting system for transmitting energy between an alternating current circuit 1 and a direct current circuit 2 through a transformer 3 and electric valve means 4 and 5. Electric valve means 4 and 5 are preferably of the type employing an ionizable medium, such as a gas or a vapor, and each includes an anode 6, a cathode 7 and a control member or grid 8 which controls the conductivity of the electric valve.

I provide a phase shifting circuit 9 of the static impedance type, which includes a winding 10 which is energized from the alternating current circuit 1. Winding 10 is provided with connections 11 and 12 and a connection 13 which is electrically intermediate the connections 11 and 12. While for the purposes of illustration I have shown the connections 11 and 12 as being located intermediate the ends of the winding 10, it is to be understood that these connections may be located at the ends of the winding and may be considered as terminal connections. A pair of electric paths is connected to one of the terminal connections, as for example connection 12; one of the paths includes a capacitance 14 and the other path includes an inductance 15. A voltage divider 16 is interposed between the pair of electric paths and the connection 11 and includes a resistance element 17 having terminal connections 18 and 19. Terminal connection 18 is connected to capacitance 14, and terminal connection 19 is connected to inductance 15. Resistance 17 is also provided with an intermediate point or connection 20 which is connected to connection 11 of winding 10. An adjustable or movable contact member 21 is provided in operative relation with resistance 17. An output circuit 22 is connected across the intermediate connection 13 and the movable contact 21 of the voltage divider 16. Resistance 17, capacitance 14 and inductance 15 may be proportioned to determine the range of phase shift. By the proper proportioning of these elements, the voltage of circuit 22 may be varied in phase through regions of very small angular displacement to substantially 360 electrical degrees. The range of phase shift obtained is increased by increasing the value of the resistance 17 relative to the ohmic values of the capacitance 14 and inductance 15.

Excitation circuits 23 and 24 are associated with electric valve means 4 and 5, respectively, and impress on the associated control members 8 periodic or alternating voltages which control the conductivities of the electric valves. Each of the excitation circuits 23 and 24 may include means such as a saturable inductive device 25 which produces an alternating voltage of peaked wave form. Each of the saturable inductive devices 25 includes a core member 26 having a shunt magnetic path 27, a restricted saturable portion 28, a primary winding 29 which is connected to circuit 22, and a secondary winding 30 which is associated with the restricted saturable portion 28 and which produces an alternating voltage of peaked wave form. Any suitable means such as a battery 31 may be employed to impress on the associated control member 8 a negative unidirectional biasing potential, and a current limiting resistance 32 may be connected in series relation with the associated control member.

The operation of the embodiment of my invention shown in Fig. 1 will be explained by considering the electric valve system when power is being transmitted from the alternating current circuit 1 to the direct current circuit 2 through transformer 3 and electric valve means 4 and 5.

It is well understood by those skilled in the art that the average voltage impressed on circuit 2 is maximum when there is substantial phase coincidence between the voltages impressed on the control members 8 relative to the applied anode-cathode voltage. That is, the voltage impressed on circuit 2 is maximum when the electric valve means 4 and 5 are rendered conductive at the beginning of the positive half cycles of applied anode-cathode voltage. When the load connected to circuit 2 is inductive, the average voltage impressed thereon will be minimum when the electric valves are rendered conductive at substantially the 90° lagging position with respect to the anode-cathode voltage. Of course, the average voltage impressed on circuit 2 will assume corresponding values for intermediate phase relationships between the voltages impressed on the control members 8 and the voltages applied between the anodes and the cathodes of the electric valves.

The phase of the voltage impressed on circuit 22 and hence the phase of the voltage impressed on control members 8 of electric valves 4 and 5 is controllable by operation of the movable contact member 21 of the voltage divider 16 in phase shifting circuit 9. For example, if it is desired to effect a progressive advancement in phase of the alternating voltage of peaked wave form impressed on control members 8 of electric valves 4 and 5, the movable contact member 21 is initially placed in engagement with terminal 18 of resistance 17 and is moved in a counterclockwise direction. The alternating voltage impressed on the output circuit 22 is progressively advanced in phase with respect to the alternating voltage of circuit 1 or with respect to the alternating voltage applied to winding 10. The range of phase shift for such operation of the movable contact member 21 is determined by the relative ohmic values of resistance 17, capacitance 14 and inductance 15.

For a more complete explanation of the manner in which the phase shifting circuit 9 operates, reference may be had to the operating characteristics shown in Fig. 2. For a particular set of values for resistance 17, capacitance 14 and inductance 15, the vector AB represents the voltage appearing between terminals 11 and 12 of winding 10 and the vector CB represents the voltage appearing across the terminals of the capacitance 14. The vector AC represents the voltage appearing across that portion of the resistance 17 of voltage divider 16 which lies between the intermediate point 20 and the terminal 18. Vector DB represents the voltage appearing across the terminals of inductance 15 and vector AD represents the voltage appearing across the terminals of the portion of resistance 17 lying between the intermediate point 20 and terminal 19. The point O represents the potential of the intermediate connection 13 of winding 10. The vector OC represents the voltage impressed on the output circuit 22. When the movable contact member 21 is in engagement with the terminal 18 of resistance 17, the voltage impressed on the output circuit 22 has a phase position corresponding to the position of vector OC. As the movable contact member 21 is rotated in a counter-clockwise direction, the vector OC assumes the positions OE, OF and OG. When the movable contact member 21 is in engagement with the intermediate point 20 of resistance 17, the vector representing the voltage impressed on circuit 22 coincides with the vector OA. For progressive movement of the movable contact member 21 in the counter-clockwise direction, the voltage impressed on the output circuit 22 progressively assumes phase positions corresponding to vectors OH, OJ and OK, and when the movable contact member 21 engages terminal 19 of resistance 17 the voltage vector of circuit 22 coincides with the vector OD. It will be noted that for the particular vector diagram shown, the phase of the voltage impressed on circuit 22 has been varied through substantially 180 electrical degrees. Of course, it is to be understood that the range of phase may be increased or decreased by the proper choice of values for resistance 17, capacitance 14 and inductance 15. For example, by increasing the value of the resistance 17 so that the vector diagram of the phase shifting circuit includes the triangles ALB and AMB, the output voltage may be rotated counter-clockwise from the position OL to the position OM, and the voltage impressed on circuit 22 may be varied in phase from the position indicated by vector OL to the position of vector OM, which is a range substantially in excess of 180 electrical degrees.

In Fig. 3 of the accompanying drawing there is illustrated a modification of the embodiment of my invention shown in Fig. 1, and corresponding elements have been assigned like reference numerals. To control the range of phase shift of the voltage impressed on output circuit 22, I provide a pair of movable impedance elements, such as adjustable resistances 33 and 34, which are connected between the pairs of electric circuits and the terminal connection 11 of winding 10. The adjustable resistances 33 and 34 serve as an agency for controlling the maximum range of phase shift occasioned by moving the contact member 21 over the resistance 17.

The operation of the embodiment of my invention shown in Fig. 3 is substantially the same as that explained above in connection with the arrangement of Fig. 1. The resistances 33 and 34 may be adjusted to establish the range of phase shift available. As the effective values of the resistances 33 and 34 are increased, the range of phase shift is also increased.

Fig. 4 diagrammatically illustrates another embodiment of my invention in which a static phase shifting circuit of the bridge type is employed. A bridge network 35 includes opposite branches comprising reactive impedance elements, such as capacitances 36 and 37, and opposite resistive branches include resistances 38 and 39. One pair of opposite junctures of the resistances and capacitances, such as junctures 40 and 41, are connected to terminal connections 11 and 12 of winding 10, and the other pair of junctures 42 and 43 are connected to terminals 18 and 19 of the resistance 17 of the voltage divider 16. The intermediate point 20 of the resistance 17 is connected to juncture 41 and terminal connection 12 of winding 10.

The phase of the alternating voltage impressed on circuit 22 may be progressively advanced by moving the contact member 21 from the terminal 18 of resistance 17 to the terminal 19 of this resistance. This arrangement permits smooth and continuous control of the phase of the output voltage over ranges extending from substantially 360° to very small angular displacements.

In Fig. 5 there is diagrammatically illustrated another embodiment of my invention which is similar in many respects to that shown in Fig. 4. The arrangement in Fig. 5 is particularly adaptable for shifting the phase of the voltage of circuit 22 within a region or range of substantially 360 electrical degrees. A voltage divider 44 is provided with a resistance 45 which is connected to the bridge circuit 35 and the winding 10. Terminal connections 46 of resistance 45 are connected to juncture 43 of the bridge 35 and to terminal 11 of winding 10. Point 47 is connected to juncture 40 of bridge 35; point 48 is connected to juncture 42 and to terminal 12 of winding 10; and point 49 is connected to juncture 41. A movable contact member 50 is operatively associated with resistance 45 and serves to shift the phase of the voltage impressed on output circuit 22 which is connected between the movable contact 50 and intermediate connection 13 of winding 10.

By rotating the contact 50 of the voltage divider 44, the voltage impressed on circuit 22 may be progressively advanced or retarded in phase throughout a 360 electrical degree range. The shift in phase of the voltage of circuit 22 is continuous and smooth throughout this range.

Certain features of the modifications of my invention shown in Fig. 4 and Fig. 5 are disclosed and claimed in divisional application, Serial No. 340,758, and which is assigned to the assignee of this application.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, apparatus for producing an alternating voltage variable in phase relative to the voltage of said alternating current circuit and of substantially constant magnitude and comprising a winding energized from said circuit and having a pair of terminal connections and an electrically intermediate connection, a pair of electric paths connected to one of said terminal connections, one of said paths including a capacitance and the other including an inductance and a voltage divider including a resistance connected across said paths, said resistance having an intermediate point connected to the other terminal of said winding and having a single movable contact for shifting the phase of said alternating voltage through substantially 180 electrical degrees, and an output circuit connected across the intermediate connection of said winding and said contact of said resistance.

2. In combination, an alternating current circuit, apparatus for producing an alternating voltage variable in phase relative to the voltage of said alternating current circuit and of substantially constant magnitude and comprising a winding energized from said circuit and having a pair of terminal connections and an electrically intermediate connection, a pair of electric paths connected to one of said terminal connections, one of said paths including a capacitance and the other including an inductance, a voltage divider including a resistance connected across said paths and having an intermediate point connected to the other of said terminal connections and a single movable contactor in operative relation with said resistance to shift the phase of said alternating voltage through substantially 180 electrical degrees, and an output circuit connected across the intermediate connection of said winding and the movable contactor of said voltage divider.

3. In combination, an alternating current circuit, apparatus for producing an alternating voltage variable in phase relative to the voltage of said alternating current circuit comprising a winding energized from said circuit and having a pair of terminal connections and an electrically intermediate connection, a pair of electric paths connected to one of said terminal connections, one of said paths including a capacitance and the other including an inductance, a voltage divider including a resistance connected across said paths, said resistance having an intermediate point connected to the other terminal of said winding, impedance elements connected between said paths and said other terminal for controlling the range of phase shift of said alternating voltage, and an output circuit connected across the intermediate connection of said winding and said voltage divider.

4. In combination, an alternating current circuit, apparatus for producing an alternating voltage variable in phase with respect to the voltage of said alternating current circuit comprising a winding energized from said circuit and having a pair of terminal connections and a connection electrically intermediate said terminal connections, a pair of electric circuits connected to one of said terminal connections, one of said circuits comprising a capacitance and the other comprising an inductance, a voltage divider including a resistance connected across said paths and having an intermediate point connected to the other of said terminal connections, adjustable resistances connected between said paths and said other of said connections to establish the range of phase shift of said alternating voltage, and an output circuit connected across the intermediate connection of said winding and said voltage divider.

5. In combination, an alternating current circuit, apparatus for producing an alternating voltage variable in phase relative to the voltage of said alternating current circuit comprising a winding energized from said circuit and having a pair of terminal connections and a connection electrically intermediate said terminal connections, a pair of electric paths connected across said terminals, one of said paths including a serially connected capacitance and a resistance and the other of said paths including a serially connected inductance and a resistance, a voltage divider including a resistance connected between junctures of the resistances and the capacitance and the inductance in said pair of circuits, said resistance of said voltage divider being provided with an electrically intermediate point connected to a common juncture of the resistances in said pair of paths, and an output circuit connected across the intermediate connection of said winding and said voltage divider.

GEORGE W. GARMAN.